United States Patent [19]

Claycomb

[11] 4,190,073
[45] Feb. 26, 1980

[54] CHOKE FOR CONTROLLING THE FLOW OF DRILLING MUD

[76] Inventor: Jack R. Claycomb, 8103 Gnow - #101, Houston, Tex. 77040

[21] Appl. No.: 727,031

[22] Filed: Sep. 27, 1976

[51] Int. Cl.² .............................................. F16K 51/00
[52] U.S. Cl. .............................. 137/238; 137/329.02; 137/329.03; 137/329.04; 166/320; 175/38; 251/63; 251/324; 251/333
[58] Field of Search .............. 137/329, 329.01, 329.02, 137/329.03, 329.04, 516.25, 489, 238; 166/91, 320; 175/38; 251/35, 63, 324, 210, 333

[56] References Cited

U.S. PATENT DOCUMENTS

| | | | |
|---|---|---|---|
| 662,249 | 11/1900 | Cadman | 137/329.02 |
| 855,517 | 6/1907 | Lippy et al. | 251/333 |
| 1,006,564 | 10/1911 | Kinsey, Jr. | 137/329.04 |
| 1,193,849 | 8/1916 | Viger | 251/333 |
| 1,202,044 | 10/1916 | Fisher | 251/333 |
| 1,204,087 | 11/1916 | Thorne | 137/329.03 |
| 1,279,599 | 9/1918 | Slaughter, Jr. | 137/329.03 |
| 1,884,442 | 10/1932 | Wells et al. | 251/333 |
| 2,059,370 | 11/1936 | Lane | 137/329.03 |
| 2,077,716 | 4/1937 | Sandlin | 137/329.03 |
| 2,634,754 | 4/1953 | Rahn | 251/63 |
| 2,728,547 | 12/1955 | Crookston et al. | 251/63 |
| 2,767,730 | 10/1956 | Laird | 137/329.02 |
| 2,778,598 | 1/1957 | Bolling, Jr. | 251/333 |
| 3,064,675 | 11/1962 | Johnson et al. | 251/63 |
| 3,703,908 | 11/1972 | Tellier | 137/238 |

*Primary Examiner*—Martin P. Schwadron
*Assistant Examiner*—G. L. Walton
*Attorney, Agent, or Firm*—Gunn and Lee

[57] ABSTRACT

This apparatus disclosed in its preferred form is a choke for controlling the flow of drilling mud which is highly abrasive. The abrasive drilling mud is introduced through a lateral port and an elongate tubular body. In the tubular body, a fluid actuated, double acting piston is forced to a choke control position. The piston has appended to it a centralized tubular extension which receives a sleeve of wear resistant material. The sleeve is positioned in a circular chamber communicated to the lateral port where the drilling mud is introduced. It travels toward a seat downstream of the body. The seat is formed of hardened material. The downstream outlet of the body is additionally lined with a wear resistent sleeve.

9 Claims, 1 Drawing Figure

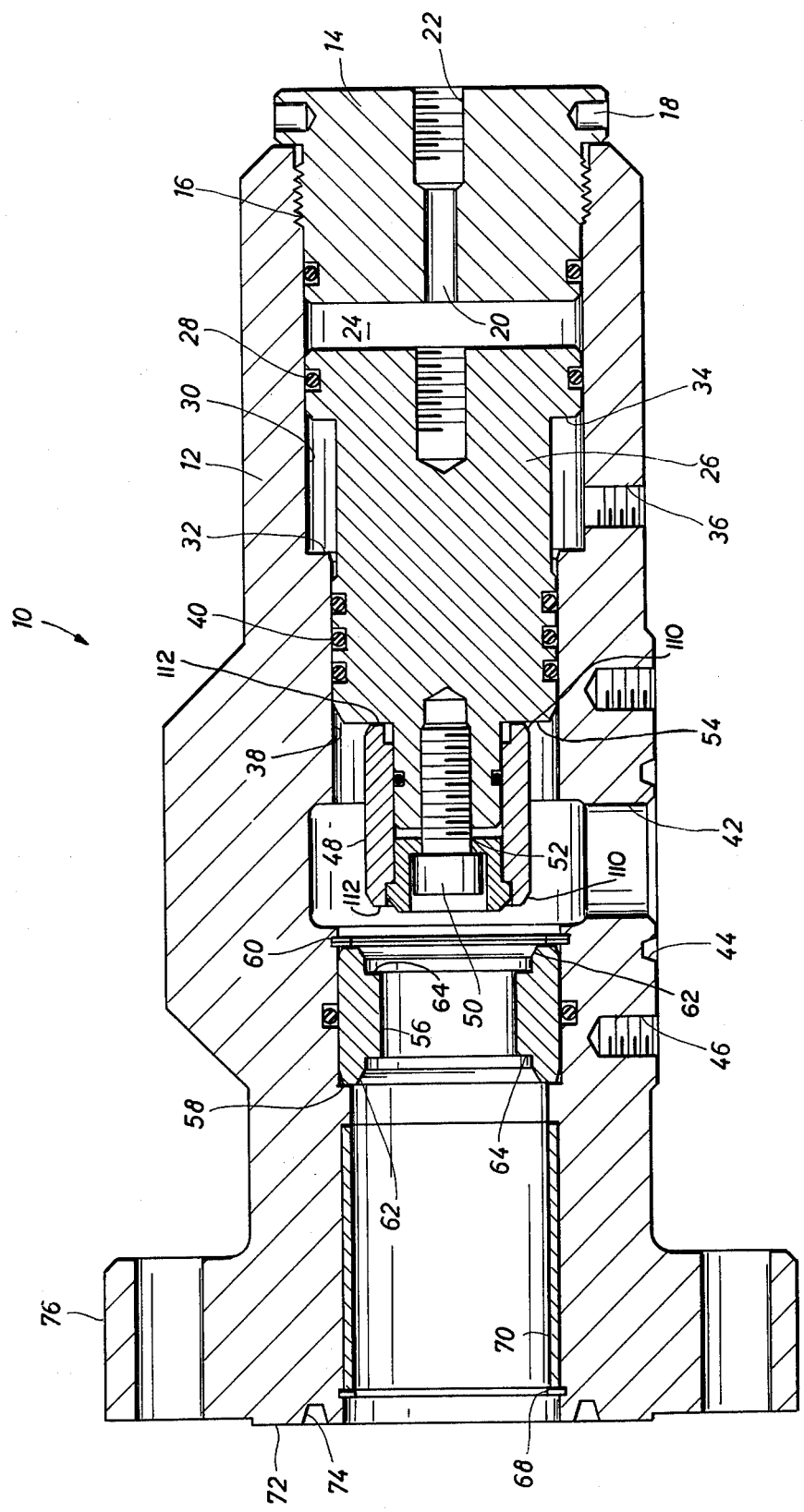

CHOKE FOR CONTROLLING THE FLOW OF DRILLING MUD

BACKGROUND OF THE PROBLEM

In the drilling of an oil well, the drilling lubricant is called drilling mud. It picks up cuttings from the bottom of the well and carries them to the top of the well and then to a mud pit where the chips or cuttings are separated. This permits the mud to be recycled and used again. The fluid flow system involving the mud is a high pressure system; accordingly, it is necessary to control this flow system with a choke. Chokes however, run into great difficulties in that the mud and the cuttings carried by it are very abrasive. Because they are abrasive, they rapidly destroy the valve and seat mechanism in the choke. The patents thus listed below are representative patents known to represent various and sundry choke flow mechanisms.

The success or failure of the prior art devices is somewhat subjective dependent on the goals; nevertheless, the present apparatus meets a need and provides a solution for that need as is disclosed hereinafter. The improved relative wear factors and the related shut down of equipment to replace the choke yields some evidence of the efficacy of the present apparatus and in particular point out how this device is able to control the highly abrasive volume of mud which flows through the mud handling system. It is very desirable to maintain a regulated back pressure in the system; accordingly, control of this back pressure through the use of the present device and in particular the longevity of the device signify the value thereof.

SUMMARY OF THE DISCLOSURE

The choke of the present device is an elongate tubular housing having in one end a closure or plug which entraps a fluid operated piston. The piston is made double acting by applying pressure to both faces controllably. The piston has a centralized plug appended to it which receives thereabout a valve member formed of an extremely hard material. It is located in a circular chamber which communicates with a lateral port where the mud flow from the well is introduced. The lateral port is directed at the valve element which is able to withstand the wear of the flow.

The apparatus further includes a circular valve seat which is inserted downstream. The valve seat is also made of hardened material. It has a tapered leading edge. It has an edge which matches or mates with the valve element itself. As the two are brought together, they close off the passage through the choke. The valve seat is a hollow circular ring which communicates with an outlet passage.

DESCRIPTION OF THE DRAWINGS

The single drawings is a sectional view taken through a diameter of the choke assembly of the present invention illustrating details of construction.

DESCRIPTION OF THE PREFERRED EMBODIMENT

The choke of the present invention is identified by the numeral 10 and incorporates an elongate tubular body 12. The body 12 is closed at one end by a plug 14 which is joined to the body 12 at a set of threads 16. The plug is provided with a pair of drilled openings 18 to enable it to be grasped by a spanner wrench to be removed. The plug is axially drilled with a passage 20 which passage is exposed to the exterior at a threaded opening 22 to enable it to be connected with a fluid line terminating in an appropriate threaded fitting. Pressurized fluid at a selected pressurized level is introduced through the passage 20 and fills a chamber 24. The chamber 24 is pressurized to a desired level for reasons to be set forth. The plug defines one end of the chamber 24 and a piston 26 is received therein. The piston has a surrounding seal 28 which seals against leakage along the piston wall 30. The piston wall 30 terminates at a shoulder 32. The piston as shown is equipped with a protruding surrounding shoulder or extension 34. The extension 34 in conjunction with the facing shoulder 32 define a circular chamber acting on the backside of the piston. A passage 36 which is appropriately tapped with threads is formed in the wall of the housing 12. This enables pressurized fluid to be introduced. The piston thus is made double acting by selectively introducing pressurized fluid on both faces thereof. It will be appreciated that the surface area of the shoulder 34 is less than the exposed space in the chamber 24 and accordingly a higher pressure is required to pressurize the piston from the left.

The piston extends into an axial passage 38 of reduced diameter. Several O-rings 40 serve as seals preventing leakage. To the left of the seals 40, the piston is exposed to the mud flow. To the right of the seals 40, it is exposed to the fluid introduced under pressure. This is the fluid for actuating the choke as will be described.

The numeral 42 identifies a laterally extending passage which is a port for the introduction of mud at high pressure. It is the inlet port for the choke 10. The opening 42 is encircled by a groove 44. The groove 44 receives a seal ring. The seal ring is clamped against a fitting which is connected to the passage. The fitting itself is preferably equipped with a flange which has a number of bolt holes drilled in it which match the location of the tapped openings 46. These enable the flange to be bolted to the body 12, the body being provided with a flat face in the vicinity of the port 42.

The numeral 48 identifies a sleeve which is affixed to a central plug on one end of the piston 26. The sleeve 48 is the valve element for closure of the choke. It will be observed that the sleeve 48 is symmetrically constructed at the right and left hand ends. It is hollow to fit over the circular appendage affixed to the piston 26. The sleeve 48 is preferably formed of a hardened metal such as tungsten carbide particles embedded in a base material. It is made wear resistant. It is equipped with a tapered leading edge 110. It is axially hollow. This enables it to be reversed on installation. It is for this reason that the right and left hand ends are identical.

The sleeve 48 is fastened in place by a bolt 50. The bolt 50 threads axially into a tapped opening formed in the piston 26 for that purpose. The bolt itself seats into a cup shaped washer 52. The washer 52 has an encircling shoulder which clamps the sleeve 48 in place. It will be noted that the sleeve 48, at each end, is undercut with a shoulder which enables the shoulder to receive the washer 52 to lock the sleeve in place. Further, the sleeve 48 is jammed against a transverse shoulder 54 at the exposed face of the piston. This limits its travel. As a consequence, the components are assembled and held in position for operation in the manner to be described.

The sleeve 48 serves as a valve element. It is positioned against a valve seat which is a removable insert indicated by the numeral 56. The valve seat 56 is a hollow sleeve. It is symmetrically shaped at the right and left hand ends. At the left hand end, it abuts a shoulder 58. At the right hand end, a snap ring 60 is used to lock it into position. The snap ring 60 is received in a groove. The snap ring locks the sleeve against the shoulder 58. The sleeve 56 is formed of hardened material including tungsten carbide. The tungsten carbide material is embedded as small particles in a supporting base metal which is itself a hard alloy. The sleeve 56 fits snuggly in an axial passage extending from the enlarged chamber communicated with the port 42. The sleeve is provided with tapered faces 62 at each end. The tapered face serves as a valve seat which operates in conjunction with a shoulder 64 to receive and seal on movement of the tapered plug 48 against the seat. The precise manner of sealing is described later. The sealing action is self cleaning as will be described. This chokes off flow through the assembly 10. In the illustrated position, the valve element 48 is spaced from the valve seat.

The sleeve 56 is reversable. The sleeve is easily reversed by removing the snap ring 60 and sliding the sleeve out, reversing it, and restoring it to the seated position shown in the drawing. As will be understood, the bulk of the wear occurs at the upstream end and very little wear occurs at the downstream end. It is for this reason that the sleeve can be reversed periodically to enable the device to have extended life.

The sleeve 56 locks against a downstream shoulder 58 as described. This limits its travel and specifies its location. This enables the sleeve to remain stationary as the piston 26 telescopes into the area adjacent to the sleeve bringing the valve element 48 towards a sealing or choking position. It will be understood that the valve element 48 is not always closed against the valve seat 56, but rather it is moved to a spaced location constricting flow. When the flow is constricted, the flow is choked by the valve in a manner determined by the operator.

The left hand end of the body 12 is axially drilled with a passage and an internal groove is formed for receiving a snap ring 68. The snap ring 68 holds in position an internal sleeve 70. The sleeve 70 is the downstream outlet sleeve of the apparatus. The body device terminates at a face 72 which is grooved at 74 to receive a seal ring. A surrounding flange 76 enables it to be connected with a mating flange constructed according to industry standards and suitable holes are provided on a bolt circle to enable the body 12 to be joined to the connective apparatus.

The sleeve 70 is made of a hardened material but it does not have to be as hard as the material used in the sleeve 56. It is also made thinner. At this point in the choke, the flow of mud is basically axial. Therefore, the sleeve 70 is not exposed to the brunt of the abrasive action which normally occurs in the valve apparatus.

In operation, the device is connected in a mud line by affixing the inlet line to the port 42 and an outlet line is connected to the flange 76 at the left hand end of the equipment. Additionally, fluid control lines are connected to the threaded and tapped openings 22 and 36. A convenient technique is to connect a pressure accumulator topped with a gas (sometimes over a liquid) to the tapped opening 36. When a suitable hydraulic pressure is introduced through the opening 22, the piston is forced to the left. When that pressure is reduced, the accumulator controls the pressure on the piston to force the piston to the end of its movement. Moreover, this a fail safe apparatus; should the fluid pressure at the fitting 22 be lost for any reason whatsoever, the piston slams wide open.

The valve element and the valve seat jointly have facing tapered edges. As they close to a gap which might pinch or clamp on a sand particle, the seat and valve element open to a wider gap downstream. Thus, any throttling which occurs is between a pair of concentric tapered surfaces which are aptly suited for long wear. The wear which does occur is limited because the choked flow is in fact almost parallel to the tapered faces.

Full closure is achieved at the facing perpendicular seats. They are fairly well protected from the flow by the position of the valve and seat in the choke position. As the valve is closed toward the seat, the tapered opposing surfaces 62 and 110 come toward one another. They close flow and if sand particles can get into the gap during closure, the wider gap between facing perpendicular faces 64 and 112 will flush and wash away the debris. Large particles are blocked upstream of the tapered faces and do not enter the seat area. The valve element thus chokes upstream of the seating surfaces. Full closure is obtained on flat facial contact, free of sand particles and the like. The valve element thus does not close fully and does not fully constrict on its outer cylindrical surface until the mud-borne particles are flushed out of the space between the facing perpendicular shoulders 64 and 112. As will be noted, the sleeve 48 enters fully within the seat 56 to seat. This requires that the tapered end portion of the valve telescope into the seat for closure. The valve has maximum diameter sliding into the seat itself.

Mud flow is introduced through the passage 42. It impinges directly on the sleeve 48. The mud is highly abrasive and tends to wear the sleeve but the wear is resisted by the use of an extremely hard material in the sleeve. The mud flow of course is diverted to the left and out through the axial passage. The flow of mud is through the controlled gap between the sleeve 48 which serves as a valve element and the sleeve 56 which serves as a valve seat. The position of the element 48 is thus controlled by the movement of the piston to regulate or choke the flow. As the flow is choked, the apparatus 10 serves its intended purpose. More importantly, it has extended life. That is to say, it is able to choke the mud flow while tolerating a certain amount of wear but at the same instant, the wear rate is materially reduced. The wear is basically localized in the sleeve 48 and the sleeve 56. The two sleeves are for this reason made of hard materials and are replacable. When the two sleeves wear out, the apparatus can be disassembled quickly and easily and the sleeves reversed. They are provided with duplicate ends. The worn end is switched away from the point of wear, the point of wear being the facing surfaces for the valve element and the valve seat.

The foregoing is directed to the preferred embodiment but the scope of the present invention is determined by the claims which follow.

I claim:

1. A choke for controlling the rate of flow of mud comprising:
   a hollow housing;
   a movable valve element in said housing;
   an encircling valve seat in said housing;
   contacting surfaces on said valve element and valve seat which include tapered throttling surfaces which, on separation, define a controllable throttling passage and which contact one another on closure wherein said throttling surfaces include:

(a) a tapered surface on said valve seat cooperative with a surface on said valve element, which, on closing movement of said valve element relative to said valve seat, defines a flow path between said valve element and said valve seat which is narrowed sufficiently to permit flow of mud while preventing entry of particles above a certain size in the mud;

(b) means for directing the flow from said tapered surface in a flushing manner across the surface of said valve element;

downstream transverse shoulders on both said valve element and valve seat which are parallel to one another and which facially close and contact against one another to close the flow through said housing, said shoulders being sheltered from fluid flow through said tapered surfaces by their respective locations on said valve element and valve seat, said shoulders being relatively spaced on said valve element and valve seat to close and contact after said tapered surfaces move to their narrowest spacing therebetween and wherein said tapered surfaces are concentric of one another and wherein one of said tapered surfaces connects immediately to said transverse shoulder.

2. The apparatus of claim 1 including a piston having a protruding end portion equipped with a detachable means for mounting said valve therein for axial telescoping movement into and out of engagement with said valve seat.

3. The apparatus of claim 2 including a cylinder surrounding said piston and aligning it for sealing movement into and out of contact with said valve seat.

4. The apparatus of claim 3 including a hollow body having an axial passage for receiving and supporting said valve seat therein.

5. The apparatus of claim 4 including a port opening into said hollow body introducing a flow of fluid toward said valve seat, and a second port downstream from valve seat which serves as an outlet.

6. The apparatus of claim 4 including an elongate body of circular cross section which terminates in an end portion serving as said valve and which body is mounted on said piston, said piston incorporating a bolt means centered therein which removable clamps said valve body in place.

7. The apparatus of claim 6 including lock means which clamps said valve seat into a fixed position relative to said valve seat, said lock means comprising a latch means for an elongate hollow sleeve comprising said valve seat.

8. The apparatus of claim 7 wherein said sleeve is double ended and duplicated at both ends, each end including said valve seat and being reversable to enable said sleeve to be repositioned and thereby use both ends.

9. The apparatus of claim 8 wherein said valve is a portion of a removable part which is provided with duplicate ends and is reversably received in said choke to enable both ends to function as a valve element.

* * * * *